Patented Apr. 15, 1952

2,593,250

UNITED STATES PATENT OFFICE 2,593,250

HYDROCARBON SYNTHESIS

James F. Black, Roselle, and Kenneth K. Kearby, Cranford, N. J., assignors to Standard Oil Development Company, a corporation of Delaware No Drawing. Application July 30, 1947, Serial No. 764,928

2 Claims. (Cl. 260—449.6)

The present invention relates to catalytic conversions and improved catalysts therefor. More particularly, the invention is concerned with improved iron catalysts for the catalytic synthesis of normally liquid hydrocarbons and oxygenated compounds from CO and $H_2$.

Iron type catalysts are normally employed in the synthesis of hydrocarbons at relatively high temperatures of about 450°–800° F. and relatively high pressures of about 3–100 atmospheres abs. or higher, to obtain predominantly unsaturated and oxygenated products from which motor fuels with high octane ratings may be recovered.

The extreme temperature sensitivity and relatively rapid catalyst deactivation of the hydrocarbon synthesis have led, in recent years, to various attempts and proposals to employ the so-called fluid catalyst technique wherein the synthesis gas is contacted with a dense turbulent bed of finely divided catalyst fluidized by the gaseous reactants and products. This technique permits catalyst replacement without interruption of the process and greatly improved temperature control. However, the adaptation of the hydrocarbon synthesis to the fluid catalyst technique has encountered serious difficulties, particularly when iron catalysts are used.

Application of the fluid technique requires in addition to the conventional characteristics determining catalyst activity, such as total desired yield and active catalyst life, ease of fluidization and attrition resistance. None of the prior art iron catalysts complies satisfactorily with all of these requirements.

Iron catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals and others in small amounts of about 1–10%. While some of these catalysts exhibit excellent activity characteristics they are without exception deficient with respect to ease of fluidization and/or attrition resistance particularly when used in commercial runs of several hundred hours duration. Even fluidized catalysts obtained from sintered iron, which have been found to exhibit excellent fluidization and attrition characteristics show signs of disintegration in long run operation.

The cause of this general lack of mechanical resistance or steady decrease of mechanical strength during operation has been found to lie in the high rate of carbon deposition on the catalyst, encountered at the conditions required by the synthesis using iron catalysts. The catalyst disintegration which accompanies excessive carbon deposition is believed to be the result of a migration of carbon into the iron lattice by the mechanism of interstitial carbide formation followed by disintegration of the carbide to free carbon. This process may continue until the catalyst mass contains about 99% of carbon.

It will be appreciated from the above that an iron catalyst of satisfactory synthesizing activity and selectivity, which may be used in commercial operation without substantial catalyst disintegration due to carbon deposit, is a need strongly felt in the synthesis art. This drawback of iron catalysts has been the major obstacle in all attempts to apply the fluid catalyst technique to the iron-catalyzed hydrocarbon synthesis. The present invention overcomes this obstacle.

It is, therefore, the principal object of the present invention to provide improved iron catalysts for the catalytic synthesis of hydrocarbons from CO and $H_2$.

A further object of our invention is to provide an improved hydrocarbon synthesis process operating in the presence of iron catalysts which are not subject to excessive disintegration due to carbon deposition.

A more specifice object of our invention is to provide an improved hydrocarbon synthesis process employing the fluid catalyst technique in the presence of iron catalysts of highest disintegration resistance throughout runs of commercial length.

Other and further objects and advantages of our invention will appear hereafter.

In accordance with the present invention, carbon deposition on iron synthesis catalysts is substantially reduced and catalyst disintegration practically eliminated by combining the iron with another metallic element which is soluble in alkali lyes or in oxidizing solutions containing alkali lyes, and which has no detrimental effect on the hydrocarbon synthesis, to form an intermetallic compound having a crystal lattice composed exclusively of iron and said other metallic element. We prefer to use alloys or intermetallic compounds of iron with silicon and/or aluminum, which have been found to afford best results. One or more such elements as lead, tin, manganese, chromium, vanadium, titanium, etc. may also be used as alloying components in combination with iron. The relative proportions of the elements in these compounds may vary within wide limits. However, the iron content should not be lower than about 10%. While we do not wish to limit our invention to any specific theory or probable reaction mechanism, it is believed that by tying the iron atom to elements of this type the iron is prevented from entering into combinations with carbon to form easily decomposing carbides.

Examples of useful compounds of this type include ferro-silicon (74% Fe, 26% Si or 52% Fe, 48% Si); ferro-chrome (31% Fe, 68% Cr, 1% Si); V-7 alloy (34% Fe, 31% Cr, 20% Si, 14% Mn, 1% Ti); ferro-titanium (23.2% Ti, 72.7% Fe, 3.2% Si, 0.9% C); ferro-vanadium (47% Fe, 52% V, 1% Si); ferro-boron (80% Fe, 19% B, 1% Si); ferro-alminum (85% Fe, 15% Al; 50% Fe, 50% Al, or 40% Fe, 60% Al).

We have further found that the degree of carbon deposition and disintegration of catalysts of the type described above is further reduced and their activity and selectivity considerably increased when these catalysts, prior to their use, are superficially etched with an alkaline agent which will selectively remove from the catalyst surface at least one of the elements combined with the iron. Agents suitable for this purpose include alkaline lyes of various concentrations, best results being obtained when using caustic alkali lyes, particularly caustic potash lye of about 5% to 40% concentration. Some of the etching agents such as KOH or NaOH when allowed to remain on the catalyst simultaneously act as catalyst promoters.

The etching time depends mainly on the temperature and the concentration of the etching lye and the type of element to be removed from the catalyst. While the time may vary from a few minutes to several hours, it is important for the low coking, non-disintegrating property of our catalysts that only a minor portion of added elements is removed from the catalyst surface and most of the iron remains bound to another element. Thus, it has been found that best results may be obtained by removing about 0.5–10% of the non-iron component, based on total catalyst, by etching from the alloy catalysts, on the basis of material having a particle size falling mostly within the approximate range of 100–325 mesh. For instance in the case of silicon alloys of the particle size indicated, preferably about 1.5–3% of the silicon is removed by etching, based on total catalyst.

The iron catalysts useful for the purposes of the present invention may be formed by mixing the oxides of the component metals followed by reduction with a reducing gas such as $H_2$ at a temperature at which reduction of the oxides to the elements and solid solution of the latter occur. When the component elements are available in the reduced state they may be fused together, preferably in the absence of oxygen. Other conventional methods of preparing compounds of the type here involved may be used.

The preformed iron compound may be etched by mixing it with a suitable alkaline etching solution whereupon excess etching agent may be removed by washing with water, the catalyst dried in an inert atmosphere and the dry composite reduced at temperatures of about 700°–1100° F. It may subsequently be sintered in a reducing or inert atmosphere at temperatures of 1000°–1600° F. The catalyst is then ready for use in the hydrocarbon synthesis either in the form of granules for fixed bed operation or in the form of finely divided particles for fluid catalyst operation.

In some cases, active catalysts of fair disintegration resistance may be prepared from the intermetallic compounds without etching. This is especially true if the compounds are surface oxidized with steam or air and then reduced with hydrogen. However, etching with alkaline agents is critical for obtaining consistently reproducible catalysts of highest activity, lowest carbonizing tendency and most persistent disintegration resistance.

The invention will be further illustrated by the following specific examples:

Example 1

990 grams of a ferrosilicon alloy containing 85% Fe and 15% Si was mixed with a solution of 10.1 grams of $K_2CO_3$ in sufficient water to form a thick paste with the ferrosilicon. The paste was dried at 250° F., mixed with 2% of a solid hydrogenated cottonseed oil as a pilling aid and pelleted. The catalyst was reduced at 900° F. in a stream of hydrogen and tested in a fixed bed laboratory unit at a temperature of about 650° F., a pressure of 250 lbs. per sq. in., a throughput of 200 v./v./hr. and a $H_2$:CO feed ratio of 1:1. Results determined between hours 32–80 of the run were as follows:

| | |
|---|---|
| CO conversion, percent | 53 |
| Yield $C_4+$, cc./m.$^3$ $H_2+CO$ | 147 |
| Yield $C_3+$, cc./m.$^3$ $H_2+CO$ | 176 |
| Ratio, $C_4+/C_1+$ | .66 |
| Mols carbon/100 mols CO reacting | .25 |
| Carbon selectivity, percent of reference | [1] 3.01 |

[1] Basis of comparison is the carbon formation on a catalyst consisting of 99% precipitated iron oxide and 1% potassium fluoride at 95% CO conversion and a $C_4+$ yield of 180 to 200 cc. per m.$^3$ $H_2+CO$ converted.

The above data show that carbon formation on the catalyst of the invention is only a fraction of that observed on the reference catalyst, while liquid product yields remain satisfactory.

Example 2

3 kilograms of the ferrosilicon of Example 1 was treated with a boiling caustic soda solution of 60% strength until 1.1 cu. ft. of hydrogen were evolved and about .5% of Si removed. The product was thoroughly washed with distilled water and mixed with a solution of 30.1 grams of potassium carbonate to form a thick paste, and dried at 250° F. The dried material was mixed with 2% of a solid hydrogenated cottonseed oil as a pilling aid and pelleted. The catalyst was reduced and tested at the conditions given in Example 1. The results determined during hours 31–76 of the run were as follows:

| | |
|---|---|
| CO conversion, percent | 92 |
| Yield $C_4+$, cc./m.$^3$ $H_2+CO$ | 160 |
| Yield $C_3+$, cc./m.$^3$ $H_2+CO$ | 221 |
| Ratio, $C_4+/C_1+$ | .55 |
| Mols carbon/100 mols CO reacting | .36 |
| Carbon selectivity, percent of reference | [1] 16.0 |

[1] Basis of comparison is the carbon formation on a catalyst consisting of 99% precipitated iron oxide and 1% potassium fluoride at 95% CO conversion and a $C_4+$ yield of 180 to 200 cc. per m.$^3$ $H_2+CO$ converted.

The above data indicate that slight etching of the alloy catalyst in accordance with the invention improves considerably the liquid product yield while only slightly increasing carbon formation, at a greatly improved CO-conversion.

Example 3

990 grams of a ferrosilicon powder containing 52% Fe and 48% Si was mixed with a solution of 10.1 grams potassium carbonate in enough water to form a thick paste. This was dried at 250° F., mixed with 2% of a solid hydrogenated cottonseed oil as a pilling aid and pelleted. The catalyst was treated with air and steam at 1900° F. and thereafter reduced and tested as described in Example 1. The results determined at hours 31–76 were as follows:

| | |
|---|---|
| CO conversion, percent | 46 |
| Yield $C_4+$, cc./m.$^3$ $H_2+CO$ | 142 |
| Yield $C_3+$, cc./m.$^3$ $H_2+CO$ | 207 |
| Ratio, $C_4+/C_1+$ | .48 |
| Mols carbon/100 mols CO reacting | .044 |
| Carbon selectivity, percent of reference | [1] 1.0 |

[1] Basis of comparison is the carbon formation on a catalyst consisting of 99% precipitated iron oxide and 1% potassium fluoride at 95% CO conversion and a $C_4+$ yield of 180 to 200 cc. per m.$^3$ $H_2+CO$ converted.

It will be seen that this catalyst affords satisfactory yields coupled with an extremely low carbon formation.

Example 4

3 kilograms of the ferrosilicon powder of Example 3 was treated with a solution of 795 grams of sodium hydroxide in 4500 cc. of water at 175°–200° F. until 2.985 cu. ft. of hydrogen were evolved and about 1.5% Si was removed. The material was thoroughly washed and impregnated with 25 grams of potassium carbonate in 50 cc. of water and dried. The dried material was mixed with 3% of a solid hydrogenated cottonseed oil as a pilling aid and pelleted. The catalyst was treated and tested as described in Example 3. The results determined at hours 55–100 of the run were as follows:

| | |
|---|---|
| CO conversion, percent | 96 |
| Yield $C_4+$, cc./m.$^3$ $H_2+CO$ | 183 |
| Yield $C_3+$, cc./m.$^3$ $H_2+CO$ | 237 |
| Ratio, $C_4+/C_1+$ | .626 |
| Mols carbon/100 mols CO reacting | .06 |
| Carbon selectivity, percent of reference | [1] 6.01 |

[1] Basis of comparison is the carbon formation on a catalyst consisting of 99% precipitated iron oxide and 1% potassium fluoride at 95% CO conversion and a $C_4+$ yield of 180 to 200 cc. per m.$^3$ $H_2+CO$ converted.

These data demonstrate that removal of about 1.5% Si from the catalyst of Example 3 in accordance with the present invention leads to a substantial increase in liquid product yield at an extremely low carbon formation and high CO-conversion.

Example 5

A catalyst was prepared substantially as outlined in Example 4 with the exception that 3,000 grams of caustic soda were used until 5.7 cu. ft. of hydrogen were evolved and about 3% of Si removed. The test results determined under the conditions of Example 4 at hours 55–100 of the run were as follows:

| | |
|---|---|
| CO conversion, per cent | 93 |
| Yield $C_4+$, cc./m.$^3$ $H_2+CO$ | 205 |
| Yield $C_3+$, cc./m.$^3$ $H_2+CO$ | 254 |
| Ratio, $C_4+/C_1+$ | .686 |
| Mols carbon/100 mols CO reacting | 0 |
| Carbon selectivity, per cent of reference | [1] 0 |

[1] Basis of comparison is the carbon formation on a catalyst consisting of 99% precipitated iron oxide and 1% potassium fluoride at 95% CO conversion and a $C_4+$ yield of 180 to 200 cc. per m.$^3$ $H_2+CO$ converted.

The above data show that the removal of about 3% Si from the ferrosilicon in accordance with the present invention affords excellent yields without any measurable carbon formation.

Example 6

3,000 grams of the ferrosilicon powder of Example 3 was treated with a solution of 800 grams of caustic soda in 4,500 cc. of distilled water at 200° F. until 12 cu. ft. of hydrogen was evolved and about 6% of Si was removed. The product was thoroughly washed, impregnated with 28 grams of potassium carbonate in 50 cc. of water and dried. The material was mixed with 3% of a solid hydrogenated cottonseed oil as a pilling aid and pelleted. The catalyst was treated and tested as described in Example 3. The results determined at hours 55–100 of the run were as follows:

| | |
|---|---|
| CO conversion, per cent | 89 |
| Yield $C_4+$, cc./m.$^3$ $H_2+CO$ | 141 |
| Yield $C_3+$, cc./m.$^3$ $H_2+CO$ | --- |
| Ratio, $C_4+/C_1+$ | --- |
| Mols carbon/100 mols CO reacting | .18 |
| Carbon selectivity, per cent of reference | [1] 10.0 |

[1] Basis of comparison is the carbon formation on a catalyst consisting of 99% precipitated iron oxide and 1% potassium fluoride at 95% CO conversion and a $C_4+$ yield of 180 to 200 cc. per m.$^3$ $H_2+CO$ converted.

These data clearly indicate a reversal in the effect of Si removal from the catalyst in accordance with the invention at a Si removal of about 6% because liquid product yield is considerably lower and carbon formation considerably higher than those obtained at the conditions of Example 5.

Example 7

1,200 grams of the powdered ferrosilicon of Example 3 was added to a solution of 1,200 grams of caustic soda in 4800 cc. of distilled water and heated to 195° F. for two days, then 1600 cc. of a 20% caustic soda solution was added and the total solution was heated for about 40 hours. Thereafter the excess liquid was replaced by a fresh solution of 1200 grams of caustic soda in 4800 cc. of distilled water and the mixture was heated for 48 hours. The last step was repeated. The product was thoroughly washed, impregnated with a solution of 6 grams potassium carbonate in 500 cc. of water, and dried at 250° F. The catalyst contained about 75% Fe, 24% Si, and 1% $K_2CO_3$. It was treated and tested as described in Examples 3 to 6. The results determined at hours 55–100 of the run were as follows:

| | |
|---|---|
| CO conversion, per cent | 93 |
| Yield $C_4+$, cc./m.$^3$ $H_2+CO$ | 92 |
| Yield $C_3+$, cc./m.$^3$ $H_2+CO$ | 139 |
| Ratio, $C_4+/C_1+$ | .356 |
| Mols carbon/100 mols CO reacting | .04 |
| Carbon selectivity, per cent of reference | [1] 3.0 |

[1] Basis of comparison is the carbon formation on a catalyst consisting of 99% precipitated iron oxide and 1% potassium fluoride at 95% CO conversion and a $C_4+$ yield of 180 to 200 cc. per m.$^3$ $H_2+CO$ converted.

The data of this example demonstrate that removal of about 50% of the Si present in the original alloy leads to a substantial reduction of the liquid product yield and thus to a catalyst of relatively low utility in spite of the fact that carbon formation is little affected.

Example 8

Three samples of a ferroaluminum containing 40% Fe and 60% Al were treated with different amounts of sodium hydroxide solutions containing the stoichiometrical NaOH equivalent to 12.5%, 50% and 100%, respectively, of the Al present in the alloy. These treatments were continued until gas evolution ceased. The concentration of the caustic soda used in the preparation of this catalyst may vary within wide limits, lower concentrations requiring more elevated temperatures. In general, a 20% caustic soda solution is preferred. When the alloy used as the starting material is finely powdered, initial cooling is required and as the reaction subsides the solution is heated and held at about 212° F. for about 3 to 6 hours. The treated alloy is then thoroughly washed and dried in an inert atmosphere.

The three samples prepared as described above were tested in a fixed bed laboratory unit at temperatures of about 600° to 625° F., a pressure of 300 lbs. per sq. in., a throughput of about 200 v./v./hr., and a $H_2:CO$ ratio of about 1:1. The results are summarized in the table given below.

| Stoichiometric per cent NaOH (based on Al) | 12.5% | | 50% | | 100% | |
|---|---|---|---|---|---|---|
| | T. | $C_4+/m.^3$ CO+$H_2$ Consumed | T. | $C_4+/m.^3$ CO+$H_2$ Consumed | T. | $C_4+/m.^3$ CO+$H_2$ Consumed |
| Run Hours | °F. | | °F. | | °F. | |
| 0-24 | 600 | 80 | 600 | 80 | 600 | 75 |
| 24-48 | 600 | 175 | 600 | 155 | 600 | 115 |
| 48-72 | 600 | 240 | 600 | 155 | 625 | 95 |
| 72-96 | 600 | 205 | 600 | 130 | | |
| 96-120 | 600 | 165 | 650 | 180 | | |
| 120-144 | 600 | 175 | 650 | 150 | | |
| 144-168 | 625 | 180 | 650 | 140 | | |
| 168-192 | 625 | 180 | | | | |

The above data clearly indicate the considerable advantage of alloy catalysts partially leached in accordance with the present invention over iron catalysts of the Raney type from which the alloy component has been almost completely leached out.

*Example 9*

The catalyst prepared in accordance with Example 4 was sized to obtain a product having a screen analysis as follows:

Micron range:                                  Per cent
- 0-44 — 37.1
- 44-62 — 29.3
- 62-88 — 22.6
- 88+ — 11

This catalyst was tested in a fluid hydrocarbon synthesis unit at a temperature of about 650° F., a pressure of about 200 lbs. per sq. in., a recycle:fresh feed ratio of 1:1, a total gas throughput of 1300 v./v./hr. and a $H_2:CO$ ratio of 1:1. The results determined at run hours 23-35 were as follows:

- CO conversion, per cent — 32
- Yield $C_4+$, cc./m.³ $H_2+CO$ — 213
- Ratio, $C_4+/C_1+$ — .779
- Mols carbon/100 mols CO reacting — .62

The screen analysis of the catalyst after about 66 hours was as follows:

Micron range:                                  Per cent
- 0-44 — 28.5
- 44-62 — 37.9
- 62-88 — 20.4
- 88+ — 13.2

It will be noted from the above data that the catalyst of the invention from which 1.5% Si has been removed by leaching combines excellent liquid product yields with satisfactory resistance to disintegration.

*Example 10*

A sample of ferrosilicon containing 73.9% Fe, 26% Si and 0.1% C. and having a particle size of 8-14 mesh was etched by immersion in a 50% solution of KOH at 180°-200° F. for 11 minutes. The etched material was dried in a stream of nitrogen at about 200° F. and thereafter reduced at 900° F. with 1,000 v./v./hr. of excess $H_2$.

Another batch of the same ferrosilicon sample was etched with HF by treating with a 10.9% HF solution in water for about ½ hour followed by washing with distilled water.

The two catalysts prepared as described above were tested in a 100 cc. fixed bed reactor at a $H_2:CO$ ratio of 1:1, a space velocity of 200 v./v./hr., and a pressure of 250 lbs. per sq. in. gauge. The test results are summarized in the table below.

*Table*

| Catalyst Preparation | Etched with KOH | | | Etched with HF | | |
|---|---|---|---|---|---|---|
| Hours on Stream | 63 to 108 | 163 to 208 | 261 to 306 | 63 to 84 | 139 to 184 | 242 to 287 |
| Operating Temp. °F | 679 | 640 | 597 | 658 | 678 | 680 |
| Per Cent Conversion | 95.5 | 97.7 | 97.5 | | 86.0 | |
| $C_5+/m.^3$ of Total Feed | 78 | 113 | 124 | 11 | 57 | 42 |
| $C_4+/m.^3$ of Feed Converted | 108 | 144 | 165 | | 126 | |
| Liquid Product, Grav. | 0.723 | | 0.719 | | 0.740 | 0.723 |
| Br. No. (Vol.) | 76.2 | 73.5 | 60.2 | | 64.6 | 55.2 |
| Per Cent Oxygen | 1.38 | | | | 0.42 | |
| $C_4$ Cut, Per Cent Butylene | 68.5 | 72.2 | 71.4 | | 73.9 | |
| Per Cent Iso-butylene | 6.7 | 8.3 | 6.2 | | 7.9 | |
| Butene-2/butene-1 | 2.2 | 2.7 | 2.0 | | 1.7 | |
| n-butane/iso-butane | 6.2 | 12.9 | 15.8 | | 14.4 | |
| Used Catalyst (Wax Free): | | | | | | |
| Per Cent C | | 0.75 | | | 3.20 | |
| Per Cent H | | 0.03 | | | 0.11 | |

The data of this last example show that the etched ferrosilicon catalyst of the invention is highly active and selective and that the carbon formation is negligible as compared to other iron catalysts on which carbon builds up to as much as 50% by weight at similar conditions. It should also be noted that the carbon formed on the catalyst etched with KOH is only a small fraction of the carbon formed on the HF-etched catalyst and that the former is far superior with respect to product yields particularly after about 160 hours on stream.

The present invention is not to be limited by any theory of the mechanism of the process or catalyst nor to any examples given merely for illustration purposes, but only by the following claims in which we wish to claim all novelty inherent in the invention.

We claim::

1. An improved process for producing valuable conversion products from CO and $H_2$ in the presence of iron catalysts which comprises contacting said CO and $H_2$ in synthesis proportions at synthesis conditions with catalyst particles containing ferrosilicon from which about 1.5 to 3 weight per cent of silicon based on the total catalyst, has been removed by etching with a caustic alkali solution and recovering a product containing normally liquid hydrocarbons.

2. The method set forth in claim 1 in which the catalyst is in the form of a fluidized bed.

JAMES F. BLACK.
KENNETH K. KEARBY.

REFERENCES CITED

The following references are of record in the file of this patent:

UNITED STATES PATENTS

| Number | Name | Date |
|---|---|---|
| 993,144 | Bosch et al. | May 23, 1911 |
| 1,937,489 | Jenness | Nov. 28, 1933 |
| 2,287,891 | Linckh | June 30, 1942 |
| 2,318,626 | Pier | May 11, 1943 |
| 2,345,957 | Wirth | Apr. 4, 1944 |
| 2,360,787 | Murphree et al. | Oct. 17, 1944 |
| 2,365,094 | Michael | Dec. 12, 1944 |
| 2,391,004 | Breuer | Dec. 18, 1945 |
| 2,402,626 | Howk | June 25, 1946 |
| 2,402,694 | Tanner | June 25, 1946 |

FOREIGN PATENTS

| Number | Country | Date |
|---|---|---|
| 282,112 | Great Britain | July 29, 1929 |
| 300,294 | Great Britain | Nov. 7, 1928 |

OTHER REFERENCES

Ser. No. 357,989, Brindlein (A. P. C.), published May 25, 1943.

Stansfield: The Electric Furnace for Iron and Steel (pages 12, 174 and 185).